United States Patent
Zhao et al.

(10) Patent No.: US 11,907,143 B2
(45) Date of Patent: Feb. 20, 2024

(54) METHOD AND DEVICE FOR TIMESTAMPING AND SYNCHRONIZATION WITH HIGH-ACCURACY TIMESTAMPS IN LOW-POWER SENSOR SYSTEMS

(71) Applicant: MediaTek Singapore Pte. Ltd., Singapore (SG)

(72) Inventors: Hongxu Zhao, Beijing (CN); Cunliang Du, Beijing (CN); Chieh-Lin Chuang, Hsinchu (TW); Zhen Jiang, Beijing (CN)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 22 days.

(21) Appl. No.: 17/720,882

(22) Filed: Apr. 14, 2022

(65) Prior Publication Data
US 2022/0414036 A1    Dec. 29, 2022

(30) Foreign Application Priority Data

Jun. 23, 2021    (CN) .......................... 202110695619.9
Mar. 28, 2022    (CN) .......................... 202210314680.9

(51) Int. Cl.
 *G06F 13/24*    (2006.01)
 *G06F 13/40*    (2006.01)
 *H04J 3/06*    (2006.01)

(52) U.S. Cl.
 CPC .......... *G06F 13/24* (2013.01); *G06F 13/4022* (2013.01); *H04J 3/065* (2013.01); *H04J 3/0685* (2013.01); *G06F 2213/0016* (2013.01)

(58) Field of Classification Search
 CPC ................. G06F 13/24; G06F 13/4022; G06F 2213/0016; H04J 3/065; H04J 3/0685
 See application file for complete search history.

(56) References Cited

U.S. PATENT DOCUMENTS 6,867,753 B2    3/2005    Chinthammit et al.
10,997,949 B2 *    5/2021    John ....................... G06F 3/011
(Continued)

FOREIGN PATENT DOCUMENTS

TW    I547878 B    9/2016
TW    202018466 A    5/2020

OTHER PUBLICATIONS

Chinese language office action dated May 3, 2023, issued in application No. TW 111117515.

*Primary Examiner* — Henry Tsai
*Assistant Examiner* — Christopher A Daley
(74) *Attorney, Agent, or Firm* — McClure, Qualey & Rodack, LLP

(57) ABSTRACT

A method for timestamping and synchronization with high-accuracy timestamps in low-power sensor systems is provided. The method is performed by a device and includes: receiving, by a sensor hub of the device, an interrupt signal from a sensor and performing an interrupt service routine (ISR) to obtain an interrupt timestamp obtained by a latch, wherein the interrupt timestamp is obtained from an always-running unified time reference; obtaining, by the sensor hub, sensor data from the sensor; predicting, by the sensor hub, a prediction timestamp based on an amount of sensor data and the interrupt timestamp by using a filtering algorithm; and correcting, by the sensor hub, a timestamp of each sensor data based on the prediction timestamp.

24 Claims, 17 Drawing Sheets

(56) References Cited

U.S. PATENT DOCUMENTS

| | | |
|---|---|---|
| 11,451,931 B1* | 9/2022 | Hariharan ............. H04W 64/00 |
| 2012/0254878 A1 | 10/2012 | Nachman et al. |
| 2017/0041688 A1* | 2/2017 | Pitigoi-Aron ............. G06F 1/08 |
| 2018/0088626 A1* | 3/2018 | Elias ......................... G06F 1/14 |
| 2019/0110264 A1* | 4/2019 | Chung ................ H04W 56/002 |
| 2021/0330216 A1 | 10/2021 | Azevedo et al. |

* cited by examiner

METHOD AND DEVICE FOR TIMESTAMPING AND SYNCHRONIZATION WITH HIGH-ACCURACY TIMESTAMPS IN LOW-POWER SENSOR SYSTEMS

CROSS REFERENCE TO RELATED APPLICATIONS

This application claims priority from China Patent Application No. 202110695619.9, filed on Jun. 23, 2021, and China Patent Application No. 202210314680.9, filed on Mar. 28, 2022, the disclosures of which are incorporated herein in their entirety by reference.

BACKGROUND

Technical Field

The present disclosure generally relates to timestamping and synchronization. More specifically, aspects of the present disclosure relate to a method and device for timestamping and synchronization with high-accuracy timestamps in low-power sensor systems.

Description of the Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Nowadays, mobile devices have increasingly higher requirements for sensor data, especially hot applications such as Augmented Reality (AR), Virtual Reality (VR), and cameras, which have put forward more requirements for accelerometer and gyroscope data. The aforementioned high requirements may include, but are not limited to:
1. higher data frequency;
2. smaller fluctuation of data timestamp difference;
3. the match between the timestamping time of data timestamp and the time point when the real data is generated;
4. data timestamps are monotonically increasing, and so on.

In the present disclosure, a sensor hub (which may also be referred to as a sensor co-processor) is connected to various sensor devices and processes data from the various sensor devices with low power consumption. Typically, the sensor hub processes data from sensors such as accelerometers, gyroscopes, etc., and performs fusion processing of the data from each sensor. After the sensor hub receives the data from the sensor devices, the sensor hub may add timestamps to the received data according to the time system of the sensor hub. The process for adding timestamps is called timestamping. After an application processor receives the data from the sensor hub, the application processor timestamps the received data according to the time system of application processor. The process for timestamping the received data is called synchronization. In the timestamping and synchronization process, when the timestamp of data is not handled properly, it may cause that the time when the data is actually generated and the timestamp is not match, which will lead to an extremely poor interaction experience for the user of the application.

The main performances of poor interaction experience are:
1. AR, VR and other applications obviously perceive that the following is not good, and the hysteresis is large;
2. Applications, such as a camera, clearly perceive increased jitter and experience difficulty in focusing.

Current timestamping methods used by the low-power sensor hub:
1. Ordinary sensor: the sensor generates an interrupt signal (DRI) to notify the low-power sensor hub. When the sensor hub receives the interrupt signal, the sensor hub records the current time, obtains data through a communication interface, and timestamps the recorded time to each data;
2. High-end sensor: the sensor adds a timestamp to each data according to the time reference of the sensor when each data is generated. The sensor hub and the sensor periodically synchronize to obtain a time offset, obtain the data and timestamps through the communication interface, and use the time offset to re-correct the timestamp of each data.

At present, the time synchronization method between the low-power sensor hub and the application processor is that the application processor accesses its time reference, the low-power sensor hub accesses its time reference, and the application processor and the sensor hub periodically obtain the time offset in a non-standby mode. The application processor re-corrects the timestamp of the sensor by the obtained time offset.

The process of recording timestamps by ordinary sensors is affected by interrupt jitter, time delay, and the response of the sensor hub, resulting in loss of accuracy. Although high-end sensors can retain certain timestamp accuracy to a certain extent in timestamping, the selection of sensors may increase the cost. The periodic synchronization between the sensor hub and the sensor may cause loss of accuracy due to the transmission jitter and delay of the communication interface, and also increase the power consumption of the entire system. The periodic synchronization of the two time references between the processors may cause loss of accuracy due to the transmission jitter and delay of the communication interface, and also increase the power consumption of the entire system.

Therefore, there is a need for a method and device for timestamping and synchronization with high-accuracy timestamps in low-power sensor systems to solve the above problems.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Therefore, the main purpose of the present disclosure is to provide a method and device for timestamping and synchronization with high-accuracy timestamps in low-power sensor systems to overcome the above disadvantages.

In an exemplary embodiment, a method for timestamping and synchronization with high-accuracy timestamps in low-power sensor systems, wherein the method is performed by a device and comprises: receiving, by a sensor hub of the device, an interrupt signal from a sensor and performing an interrupt service routine (ISR) to obtain an interrupt timestamp obtained by a latch, wherein the interrupt timestamp is obtained from an always-running unified time reference; obtaining, by the sensor hub, sensor data from the sensor; predicting, by the sensor hub, a prediction timestamp based on an amount of sensor data and the interrupt timestamp by using a filtering algorithm; and correcting, by the sensor hub, a timestamp of each sensor data based on the prediction timestamp.

In some embodiments, the interrupt timestamp is obtained from the always-running unified time reference when a level of a signal output from a sensor interrupt pin between the sensor and the sensor hub has changed.

In some embodiments, the interrupt timestamp is obtained from the always-running unified time reference when an interrupt controller in the sensor hub initiates an interrupt.

In some embodiments, the filtering algorithm is a Kalman filtering algorithm.

In some embodiments, predicting the prediction timestamp based on the amount of sensor data and the interrupt timestamp by using the filtering algorithm further comprises: selecting filter parameters according to the amount of sensor data and the interrupt timestamp; calculating a trust interval based on the filtering parameters; obtaining Kalman filter matrices according to the trust interval, the interrupt timestamp and an event trigger type; and predicting the prediction timestamp according to the Kalman filter matrices.

In some embodiments, correcting the timestamp of each sensor data based on the prediction timestamp further comprises: determining whether the prediction timestamp is before the interrupt timestamp and whether a first prediction timestamp lags behind the timestamp; performing a Kalman filter update to update the prediction timestamp and an average interval between the sensor data; and correcting the timestamp of each sensor data based on the prediction timestamp and the average interval.

In some embodiments, the interrupt timestamp is obtained from the always-running unified time reference when an inner band interrupt (IBI) signal output from an improved inter integrated circuit (I3C) controller conforms to settings in an I3C protocol.

In some embodiments, a system time of an application processor, a system time of the sensor hub, and a system time of the latch are derived from the time of the always-running unified time reference.

In some embodiments, an application processor performs steps performed by the sensor hub when the device does not have a sensor hub.

In some embodiments, the method further comprises: obtaining, by the sensor hub, a system time of the sensor hub and a first time from the always-running unified time reference; obtaining, by an application processor of the device, a system time of the application processor according to the interrupt signal and a second time from the always-running unified time reference; calculating, by the application processor, a time offset between the system time of the sensor hub and the system time of the application processor according to the system time of the application processor and the system time of the sensor hub by using a filtering algorithm; and using, by the application processor, the time offset to re-correct the timestamp of each data transmitted from the sensor hub.

In some embodiments, the method further comprises: obtaining, by the sensor hub, a system time from the sensor through a controller; obtaining, by the latch, a first time from the time of the always-running unified time reference when the controller finds a time synchronization protocol; obtaining, by the sensor hub, a time offset by using a filtering algorithm according to the system time and the first time transmitted from the latch; and writing, by the sensor hub, the time offset to the sensor for time synchronization between the sensor hub and the sensor through the controller; wherein the system time is based on a time reference that is different from the always-running unified time reference.

In some embodiments, the sensor is a high-end sensor and the controller can be an inter-integrated circuit/serial peripheral interface (I2C/SPI) communication interface.

In an exemplary embodiment, a device for timestamping and synchronization with high-accuracy timestamps in low-power sensor systems, comprising: a sensor hub, coupled to a latch and a sensor, and the sensor hub executes: receiving an interrupt signal from the sensor and performing an interrupt service routine (ISR) to obtain an interrupt timestamp obtained by the latch, wherein the interrupt timestamp is obtained from an always-running unified time reference; obtaining sensor data from the sensor; predicting a prediction timestamp based on an amount of sensor data and the interrupt timestamp by using a filtering algorithm; and correcting a timestamp of each sensor data based on the prediction timestamp.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to their size in actual implementation in order to clearly illustrate the concept of the present disclosure.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

This description is made for the purpose of illustrating the general principles of the invention and should not be taken in a limiting sense. The scope of the invention is best determined by reference to the appended claims.

The following description is presented to enable one of ordinary skill in the art to make and use the disclosure and is provided in the context of a patent application and its requirements. Various modifications to the preferred embodiments and the generic principles and features described herein will be readily apparent to those skilled in the art. Therefore, the present invention is not intended to be limited to the embodiments shown, but is to be accorded the widest scope consistent with the principles and features described herein.

Figure 1:
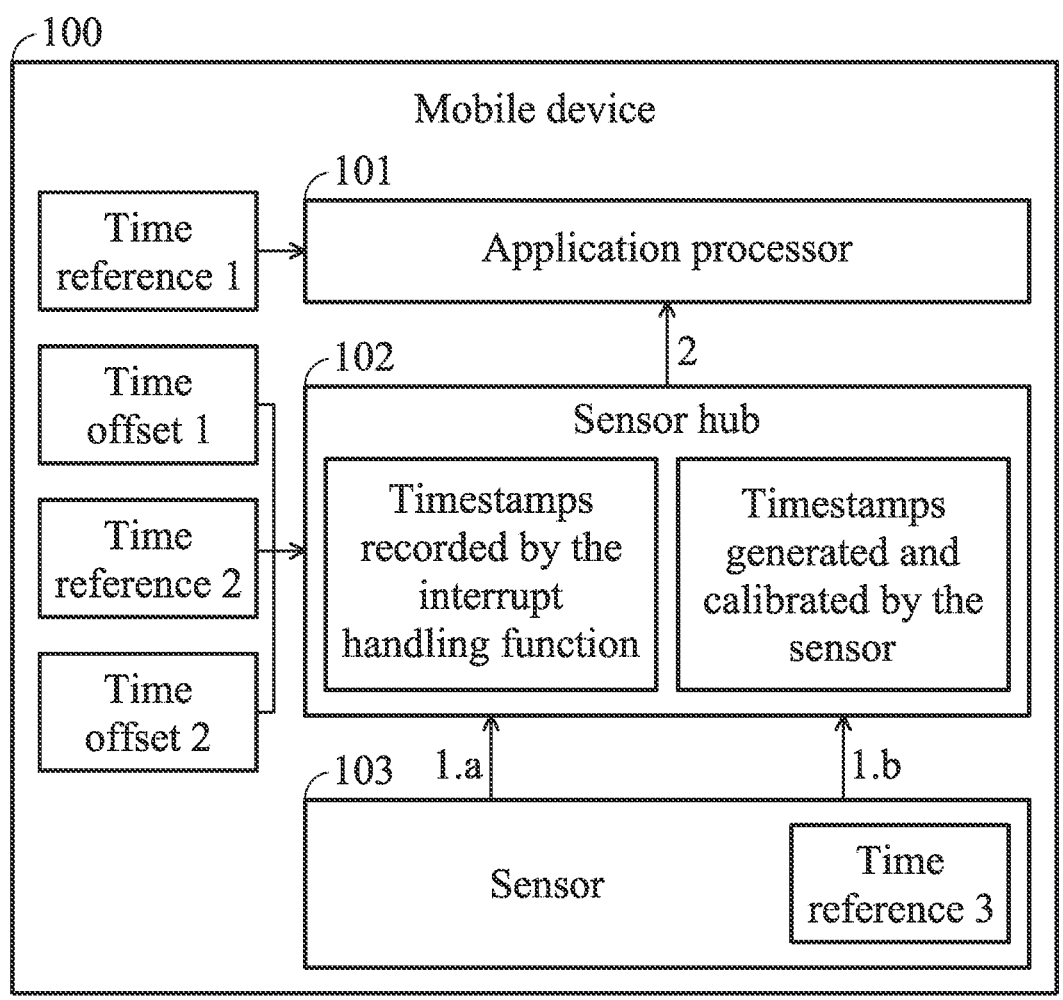
FIG. 1 shows a schematic diagram of a mobile device in the prior art.

FIG. 1 shows a schematic diagram of a mobile device 100 in the prior art. As shown in FIG. 1, there are two processing methods for timestamping between a sensor hub 102 and a sensor 103, namely: a processing method 1.a and a processing method 1.b. The processing method 1.a is the timestamping method of the sensor hub 102 for ordinary sensors. The sensor 103 generates an interrupt signal (DRI) to notify the sensor hub 102. After receiving the interrupt signal, the sensor hub 102 records the current time, obtains data through a communication interface (not shown in FIG. 1), and timestamps the recorded time to each data. In the processing method 1.a, the process of recording the timestamps may be affected by interruption jitter, time delay and the response of the sensor hub 102, resulting in loss of accuracy. The processing method 1.b is that the sensor 103 binds a timestamp to each data generated by the sensor 103 through the time reference 3 of the sensor 103. The sensor hub 102 synchronizes with the sensor 103 periodically to obtain a time offset 2. The sensor hub 102 obtains the data and the timestamps from the sensor 103 through the communication interface, and uses the time offset 2 to re-correct the timestamp of each data. Although the processing method 1.b can retain certain timestamp accuracy to a certain extent, the selection of the sensor may increase the cost. Similar to the processing method 1.a, the periodic synchronization between the sensor hub and the sensor may be affected by the transmission jitter of the communication interface and the time delay to cause loss of accuracy and also increase the power consumption of the entire system.

In the prior art, the synchronization between the sensor hub 102 and the application processor 101 is the processing method 2. The application processor 101 accesses the time reference 1, and the sensor hub 102 accesses the time reference 2. In the non-standby mode, the application processor 101 periodically acquire the time offset 1 with the sensor hub 102 synchronously, and re-correct the timestamps of the sensor 103 by using the acquired time offset 1. Because the periodic synchronization of the two time references (the time reference 1 and the time reference 2) of the application processor 101 and the sensor hub 102 will be affected by the transmission jitter and delay of the communication interface, resulting in loss of accuracy and also increasing the power consumption of the entire system.

Figure 2:
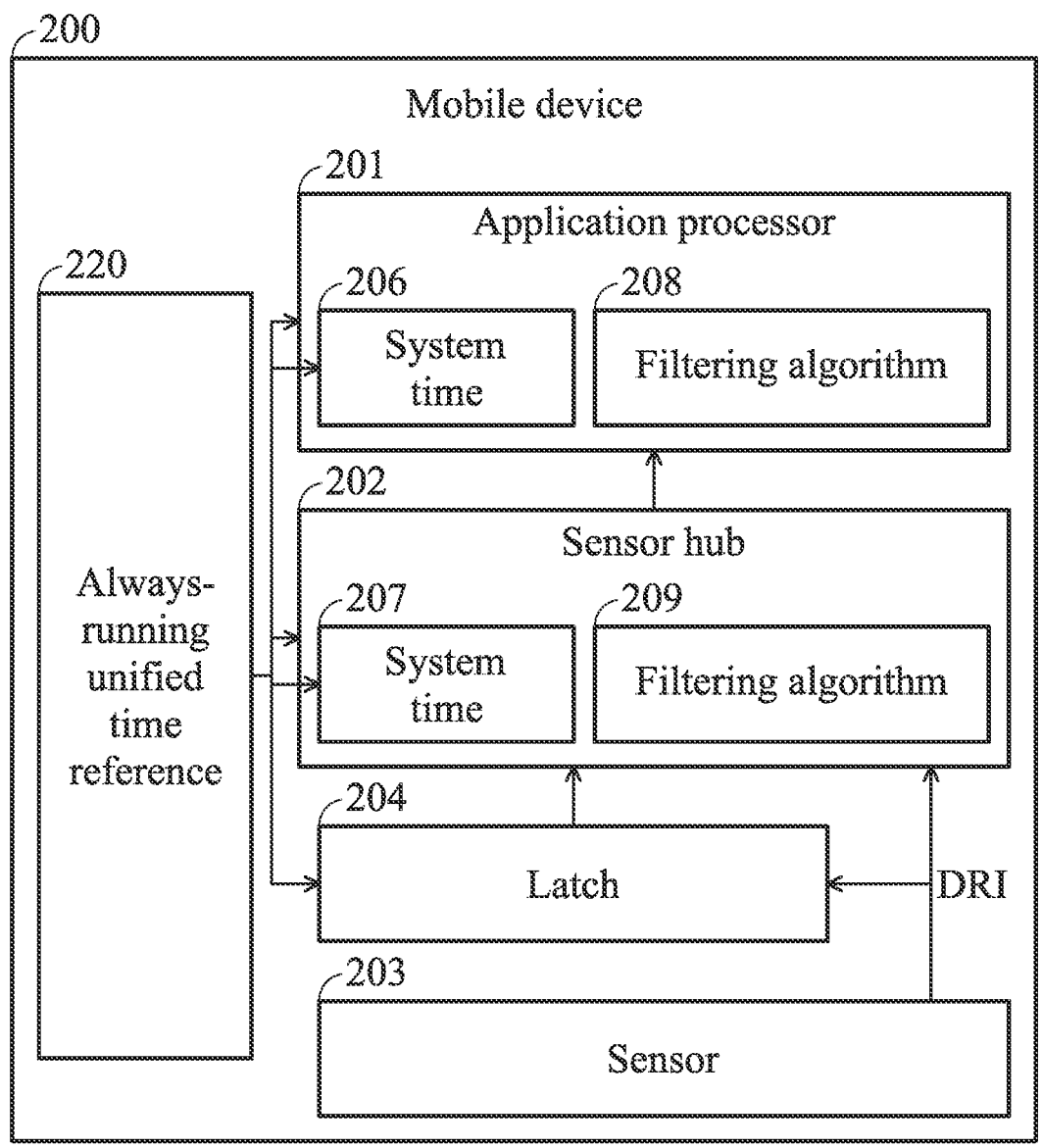
FIG. 2 shows a schematic diagram of a mobile device according to an exemplary embodiment of the present disclosure.

FIG. 2 shows a schematic diagram of a mobile device 200 according to an exemplary embodiment of the present disclosure. The mobile device 200 comprises an application processor 201, a sensor hub 202, at least one sensor 203, at least one latch 204 and an always-running unified time reference 220.

The application processor 201 may be embodied as any type of processor capable of performing the functions described herein. For example, the application processor 201 may be embodied as a single or multi-core processor(s), a single or multi-socket processor, a digital signal processor, a graphics processor, a microcontroller, or other processor or processing/controlling circuit.

The sensor hub 202 may be embodied as any device or set of devices capable of performing the described function. The sensor hub 202 may be embodied as an integrated circuit, an embedded system, components on a printed circuit board, and/or the like. In some embodiments, a portion of the sensor hub 202 may be embodied as a portion of a system-on-a-chip (SoC), together with some or all of the application processor 201, the memory (not shown in FIG. 2), and the I/O subsystem (not shown in FIG. 2), with a portion of the sensor hub 202 (such as the one or more sensor 203) separate from the SoC.

The sensor 203 may include any type of sensor that may be used with the mobile device 200. For example, the sensor 203 may include a microphone, an image sensor, an accelerometer, a gyroscope, a light sensor, and/or the like.

The always-running unified time reference 220 may be embodied as any type of clock to produce timing values indicative of passage of time, such as a crystal oscillator or a ceramic oscillator, an inductor-capacitor (LC) clock, a resistor-capacitor (RC) clock, etc.

In FIG. 2, the always-running unified time reference 220 is used in the mobile device 200, and the system time 206 and the system time 207 are both generated based on the always-running unified time reference 220. The sensor 203 transmits the interrupt signal (DRI) to the sensor hub 202 and the interrupt signal can be monitored by the latch 204. The sensor hub 202 executes the filtering algorithm 209, and the application processor 201 executes the filtering algorithm 208. In the design scheme of FIG. 2, the design of obtaining the interrupt signal DRI time through the latch 204 and using the trust filtering algorithm of the DRI time to correct the timestamps of data can solve the problem of the loss of timestamp accuracy after the sensor hub 202 obtains the data. Through the design of always-running unified time reference and the design of de-jitter filtering algorithm, the offset of the synchronization transmission between the application processor 201 and the sensor hub 202 is eliminated, and the problem of timestamp synchronization loss accuracy between the sensor hub 202 and the application processor 201 is solved. Specifically, the always-running unified time reference 220 is guaranteed to always run, maintain high precision (13M) and low power consumption when the application processor 201 enters the standby mode. When sampling is completed by the sensor 203, the interrupt signal DRI may be triggered to notify the latch 204 and the sensor hub 202. The latch 204 monitors the level of the interrupt signal. The latch 204 obtains and records the time from the always-running unified time reference 220 when the level changes. The sensor hub 202 receives the interrupt signal, obtains the time recorded by the latch 204 and the data from the sensor 203, and executes the filtering algorithm 209 to add a timestamp to each data. The application processor 201 accepts the interrupt, calculates the time offset between the sensor hub 202 and the application processor 201 through the filtering algorithm 208, and re-corrects the timestamps of the data transmitted from the sensor hub 202.

It should be noted that the filtering algorithms 208 and 209 are presented as a general solution and are not intended to limit the concepts of the disclosure to the particular forms (e.g. Kalman filtering, moving window filtering, etc.), but are intended to cover the functionality of all modifications, alternatives and equivalents of the algorithms similar to the filtering algorithms in the disclosure.

The illustrative mobile device 200 may be embodied as any type of compute device capable of performing the functions described herein. For example, the mobile device 200 may be embodied as or otherwise be included in, without limitation, a wearable computer, an embedded computing system, a System-on-a-Chip (SoC), a smartphone, a cellular phone, a tablet computer, a notebook computer, a laptop computer, a server computer, a desktop computer, a handset, a messaging device, a camera device, a multiprocessor system, a processor-based system, a consumer electronic device, and/or any other computing device.

In some embodiments, one or more of the illustrative components of the mobile device 200 may be incorporated in, or otherwise form a portion of, another component. For example, the sensor hub 202, or portions thereof, may be incorporated in the application processor 201 in some embodiments.

As will be appreciated by persons skilled in the art, the circuits of the elements in the mobile device 200 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

Figure 3:
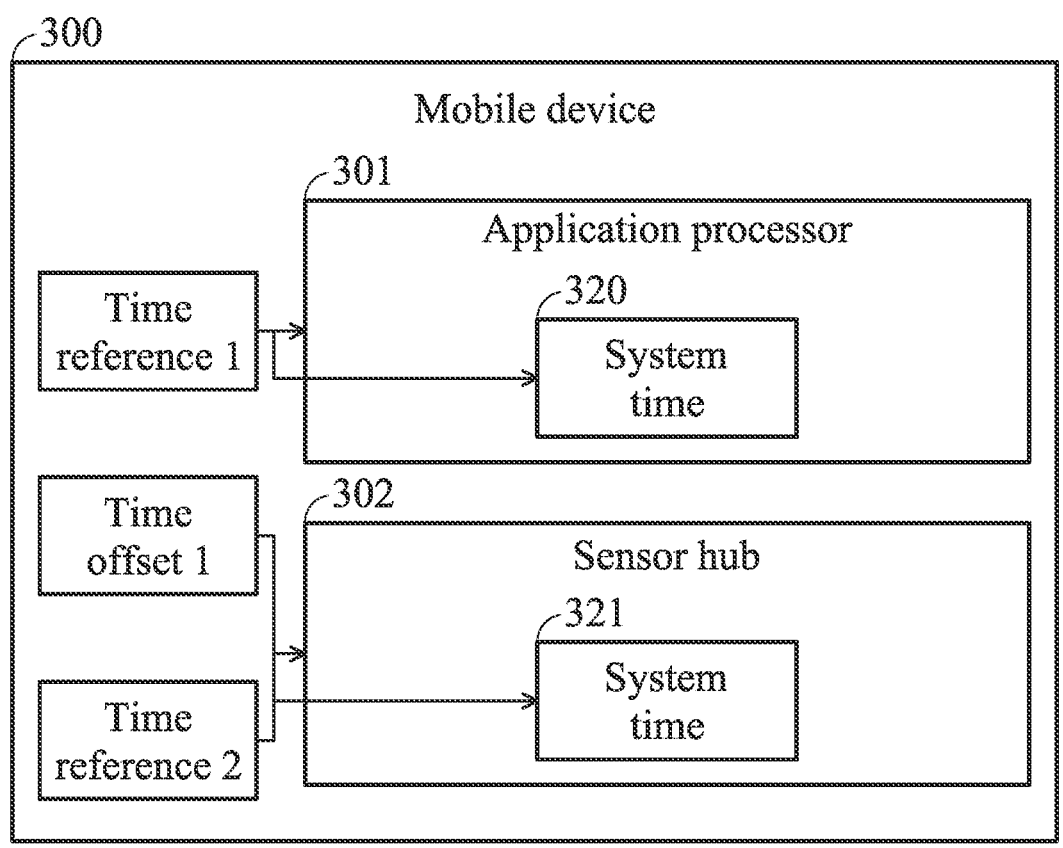
FIG. 3 shows a schematic diagram of different time references used in a mobile device in the prior art.

FIG. 3 shows a schematic diagram of different time references used in a mobile device 300 in the prior art. As shown in the prior art of FIG. 3, since the time reference 1 cannot be accessed by the sensor hub 302 when the application processor 301 is in a standby mode, the application processor 301 and the sensor hub 302 need to have their own corresponding time reference 1 and 2, respectively. The application processor 301 generates the system time 320 based on the time reference 1, and the sensor hub 302 generates the system time 321 based on the time reference 2. Therefore, the synchronization of the system times based on different time bases will have a large deviation. Especially when the application processor 301 has been in the standby mode for a period of time, the deviation between the application processor 301 and the sensor hub 302 may be greater when performing the first synchronization.

Figure 4:
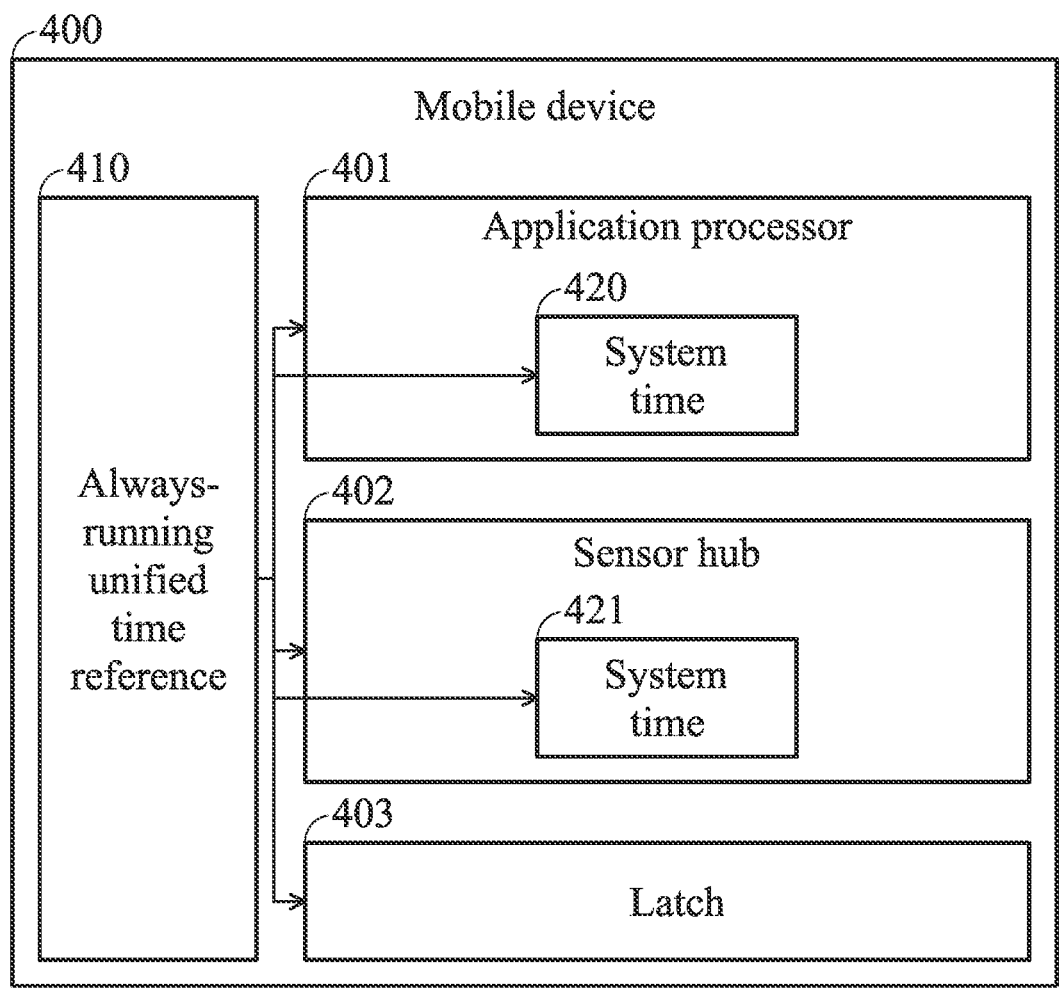
FIG. 4 shows a schematic diagram of an always-running unified time reference used in a mobile device of an exemplary embodiment of the present disclosure.

FIG. 4 shows a schematic diagram of an always-running unified time reference used in a mobile device 400 of an exemplary embodiment of the present disclosure. In FIG. 4, the always-running unified time reference 410 is used in the mobile device 400 and maintains low power and high precision (13M precision and low power consumption are maintained when the application processor 401 goes into the standby mode). The application processor 401, the sensor hub 402, and the time reference for the latch 403 are all derived from the time reference 410. The first timestamping of the sensor data is based on the system time 421 of the sensor hub 402. After the sensor data is transmitted to the application processor 401, the second synchronization is performed, and the timestamp based on the system time 421 of the sensor hub 402 is re-mapped to the timestamp based on the system time 420 of the application processor 401. Through the time reference 410 shared by the application processor 401, the sensor hub 402 and the latch 403, the deviation between the system times is only the deviation caused by the inconsistent processing of the time reference by different processors, and this deviation is very small and can be easily removed by the filtering algorithm.

Figure 5:
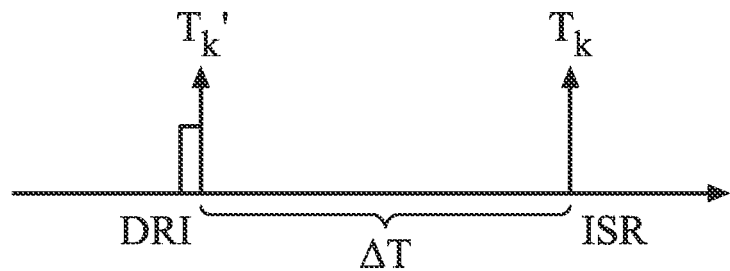
FIG. 5 shows a schematic diagram of the time offset of the interrupt signal DRI in the prior art.

FIG. 5 shows a schematic diagram of the time offset of the interrupt signal DRI in the prior art. As shown in FIG. 5, when the sensor data sampling is completed, the interrupt signal DRI is issued at the time of $T_k'$ by the sensor to an interrupt controller of the sensor hub. Then, the interrupt controller sends the interrupt signal to the application processor to execute the software operation at the time of $T_k$. In the process, the overall error $\Delta T = T_k - T_k'$. The error is mainly divided into a hardware part and a software part. In the hardware part, the interrupt controller may determine the priority after receiving the interrupt signal. When a high priority interrupt is currently being serviced, the interrupt controller waits. Therefore, the jitter and the delay of the interrupt controller cause the first error. In the software part, after the interrupt controller sends the interrupt signal to the application processor, the interrupt controller may be affected by the system shutdown interrupt and cannot be executed immediately. Thus, the system response causes a second error.

Figure 6A:
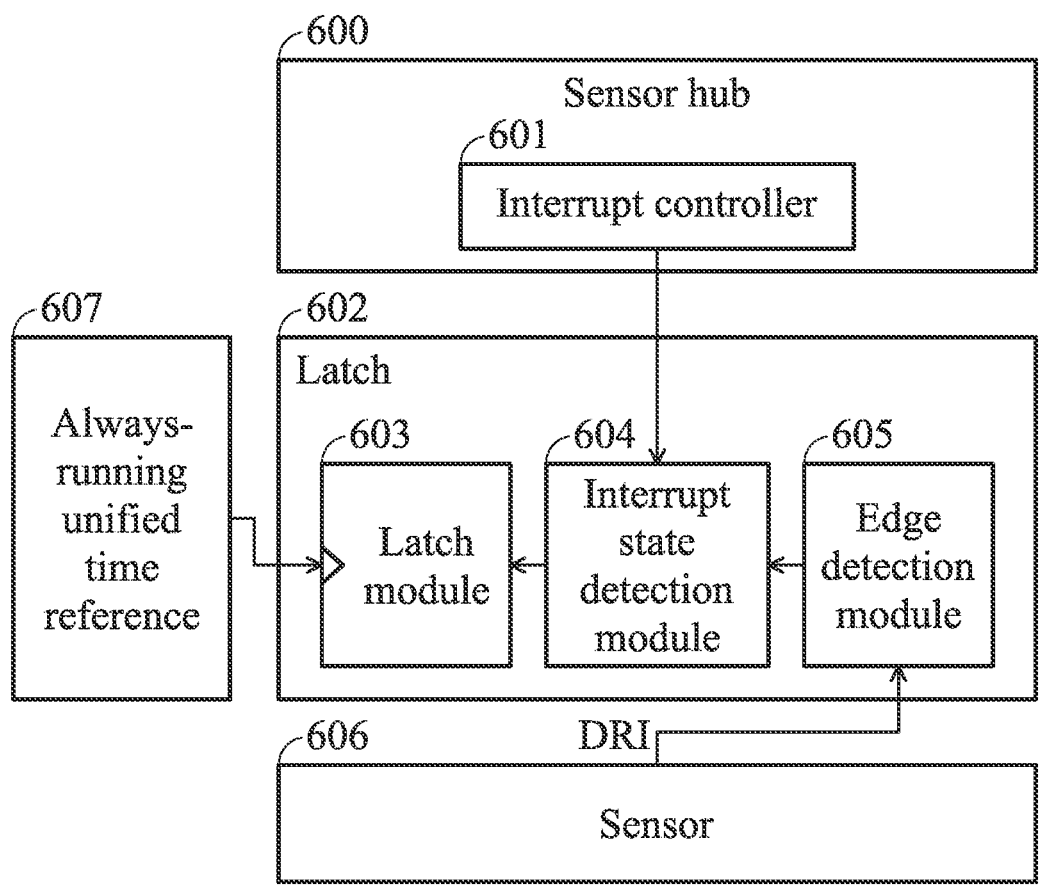
FIG. 6A shows a schematic diagram of a latch of an exemplary embodiment of the present disclosure.

FIG. 6A shows a schematic diagram of a latch 602 of an exemplary embodiment of the present disclosure. In FIG. 6A, the latch 602 includes a latch module 603, an interrupt state detection module 604 and an edge detection module 605. The interrupt state detection module 604 receives the signals from the interrupt controller 601 of the sensor hub 600. The edge detection module 605 receives the interrupt signal DRI from the sensor 606. The latch module 603 receives the time of the always-running unified time reference 607.

Figure 6B:
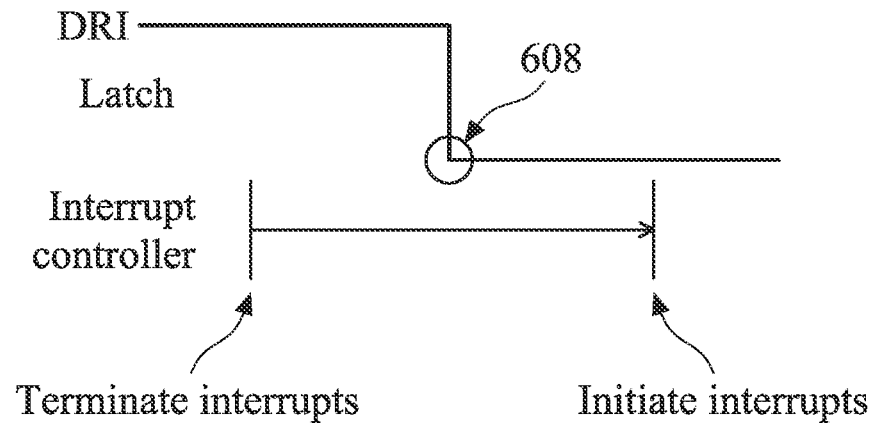
FIG. 6B shows a schematic diagram of a latch being triggered according to an exemplary embodiment of the present disclosure.

FIG. 6B shows a schematic diagram of a latch being triggered according to an exemplary embodiment of the present disclosure. In FIG. 6B, the latch 602 monitors a level of a signal output from a sensor interrupt pin (DRI), the sensor interrupt pin is between the sensor and the sensor hub to notify the sensor hub after the sensor data is ready. When the level of a signal output from the sensor interrupt pin has changed, the latch 602 obtains the interrupt timestamp from the always-running unified time reference 607. Specifically, the falling edge of the level of DRI or the rising edge of the level of DRI triggers the latch 602 to obtain an interrupt timestamp from the always-running unified time reference 607. In addition, in FIG. 6B, the interrupt controller 601 can terminate interrupts or initiate interrupts. The latch 602 refers to the interrupt signal DRI and the signal output from the interrupt controller 601 to determine whether to obtain and store the time from the always-running unified time reference 607. An example is shown in FIG. 6B, the manner of triggering the latch 602 does not refer to the interrupt state of the interrupt controller 601 in the sensor hub 600, as long as the edge of the level changes, the interrupt time is obtained from the always-running unified time reference at time 608 and stored by the latch 602.

Referring to the exemplary schemes of FIG. 6A and FIG. 6B, the latch 602 obtains the interrupt time from the always-running unified time reference and stores the interrupt time for subsequent filtering algorithms, thereby eliminating the error $\Delta T$ and greatly improving the accuracy of the timestamp.

Figure 7:
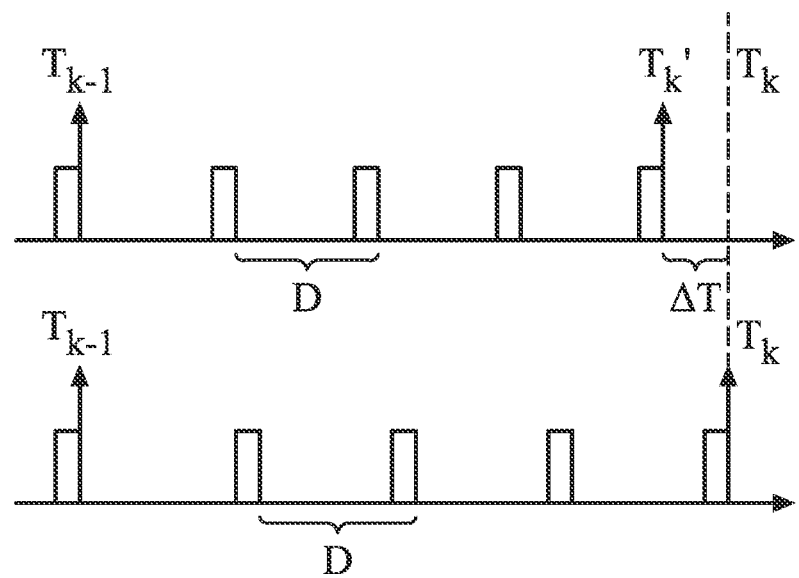
FIG. 7 shows a schematic diagram of a timestamp estimation method by the sensor hub in the prior art.

FIG. 7 shows a schematic diagram of a timestamp estimation method by the sensor hub in the prior art. As shown in FIG. 7, it is assumed that the sensor generates an interrupt every 4 pieces of data, the sensor may send an interrupt to the sensor hub at the time of $T_k'$. When there is no latch, the time recorded by the sensor hub may be $T_k$, resulting in an error $\Delta T$. Since the calculated average interval D between data is larger than the actual interval, the timestamp of each data is deviated from the real time point when the data is generated. Using the timestamps to calculate the calculated average interval D may be inaccurate enough to truly track how often the sensor generates data. The average interval D is expressed by the following formula:

$$D = \frac{(T_k - T_{k-1})}{N}, T_{k-1} = T_k - (N-1)D$$

wherein $T_k'$ is the time when the sensor currently generates an interrupt, $T_{k-1}$ is the time when the sensor last generated an interrupt, $T_k$ is the time recorded by the sensor hub when the sensor hub receives an interrupt and N is the amount of data.

Figure 8:
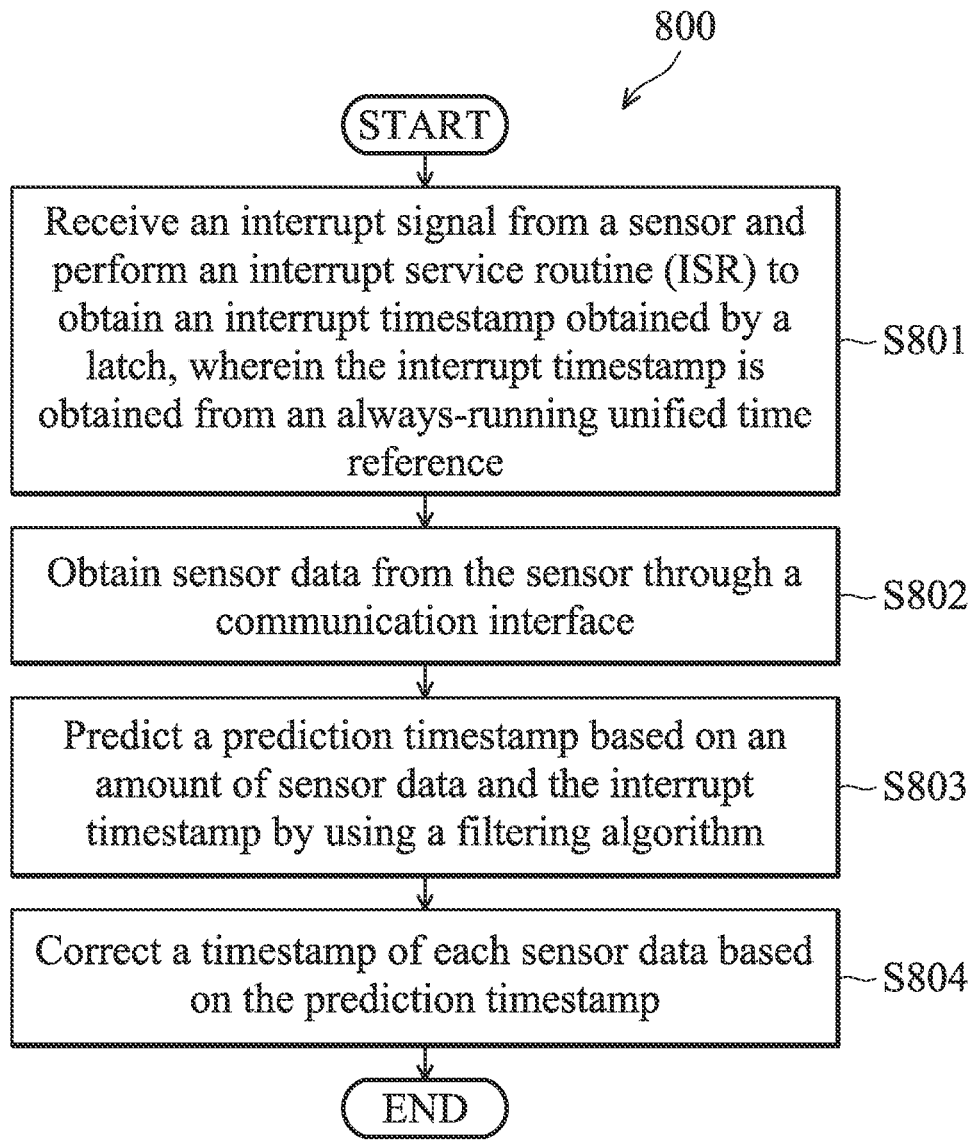
FIG. 8 is a flowchart illustrating a method for timestamping and synchronization with high-accuracy timestamps in low-power sensor systems according to an exemplary embodiment of the disclosure.

FIG. 8 is a flowchart illustrating a method for timestamping and synchronization with high-accuracy timestamps in low-power sensor systems according to an exemplary embodiment of the disclosure, wherein the method is performed by a device. In the exemplary scheme of FIG. 8, the sensor hub predicts the data frequency and corrects the timestamps of the sensor data using the time of interrupt signal DRI stored by the latch and the trust filtering algorithm of the time of interrupt signal DRI. The timestamping process performed by the sensor hub is as follows.

In step S801, the sensor hub of the device receives an interrupt signal from a sensor and performs an interrupt service routine (ISR) to obtain an interrupt timestamp obtained by a latch, wherein the interrupt timestamp is obtained from an always-running unified time reference. In another embodiment, the sensor hub further converts the interrupt timestamp into a timestamp based on a system time of the sensor hub after obtaining an interrupt timestamp.

In step S802, the sensor hub obtains sensor data from the sensor through a communication interface.

In step S803, the sensor hub predicts a prediction timestamp based on an amount of sensor data and the interrupt timestamp by using a filtering algorithm. (It should be noted that a general solution is provided in the disclosure, and the filtering algorithm includes various algorithms. Therefore, the Kalman filtering algorithm is used as an example in the disclosure).

In step S804, the sensor hub corrects a timestamp of each sensor data based on the prediction timestamp.

Figure 9:
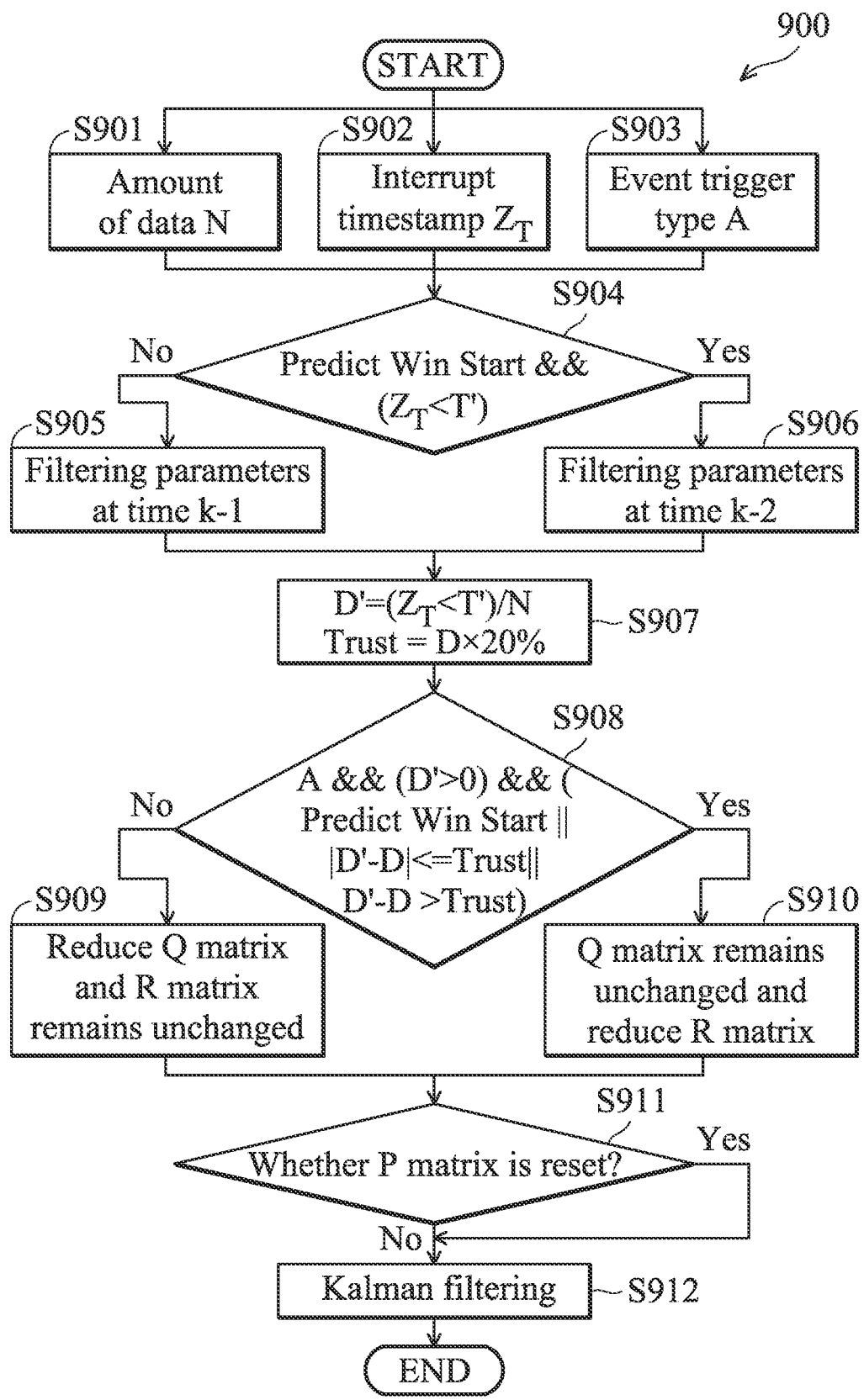
FIG. 9 is a flowchart illustrating a process for predicting timestamps according to an exemplary embodiment of the disclosure.

FIG. 9 is a flowchart illustrating a process 900 for predicting timestamps according to an exemplary embodiment of the disclosure. This flowchart is the more detailed description of step S803 in FIG. 8. In FIG. 9, the timestamp is predicted through the filtering algorithm. Taking the Kalman filtering algorithm as an example, P, Q and R matrices are dynamically set and used to predict the prediction timestamp according to the trust degree of interrupt timestamp.

In step S901, the sensor hub obtains the amount of data N from the sensor through the communication interface. In step S902, the sensor hub obtains the interrupt timestamp $Z_T$ from the latch, wherein the interrupt timestamp $Z_T$ is the interrupt time when the sensor issue the interrupt signal. In step S903, the sensor hub detects the event trigger type A, wherein the event trigger type A is how the sensor hub reads the sensor. There are two ways for the sensor hub to read the sensor, one is that the sensor actively triggers the interrupt to notify the sensor hub, and the other is that the sensor hub actively reads data periodically. These two ways may affect the dynamic setting of the Q matrix and R matrix of the Kalman filter.

In step S904, the sensor hub determines whether the filtering parameters at time k−1 (such as step S905) or the filtering parameters at time k−2 (such as step S906) should be selected according to the first data after the sensor is enabled and the interrupt timestamp $Z_T$, wherein T' is predicted value of the interrupt timestamp, and $Z_T$ is observed value of the interrupt timestamp.

In step S907, the sensor hub calculates D' (D' is an average value) at time k and the trust interval Trust through the filtering parameters, and the trust percentage is 20%, wherein D' and Trust is expressed by the following formula:

$$D' = (Z_T - T')/N$$

$$\text{Trust} = D \times 20\%$$

In step S908, when the event trigger type is that the sensor hub actively reads data (that is, the timestamp $Z_T$ obtained by the latch is untrustworthy), the prediction value is trusted by reducing the Q matrix of the Kalman filtering (as shown in step S909). In the case where the event trigger type is that the sensor actively triggering the interrupt, when the first data satisfies the trust interval 20% or $Z_T$ is much larger than T' (that is, the timestamp $Z_T$ obtained by the latch is reliable), the measured value is trusted by reducing the R matrix of the Kalman filtering (as shown in step S910).

In step S911, when the measured value (the prediction value) is trusted at time k−1 and the sensor hub determines that the prediction value (the measured value) should be trusted more at time k through calculation, the P matrix is reset so that the Kalman filtering algorithm can quickly follow the state change.

In step S912, the sensor hub predicts a prediction timestamp through the P, Q, R matrices of the Kalman filtering by using the Kalman filtering state equation, wherein Kalman filtering state equation is expressed by the following formula:

$$\begin{bmatrix} T \\ D \end{bmatrix}_k = \begin{bmatrix} 1 & N \\ 0 & 1 \end{bmatrix} \begin{bmatrix} T \\ D \end{bmatrix}_{k-1} + Q$$

$$[Z_T]_k = \begin{bmatrix} 1 & 0 \end{bmatrix} \begin{bmatrix} T \\ D \end{bmatrix}_k + R$$

Figure 10:
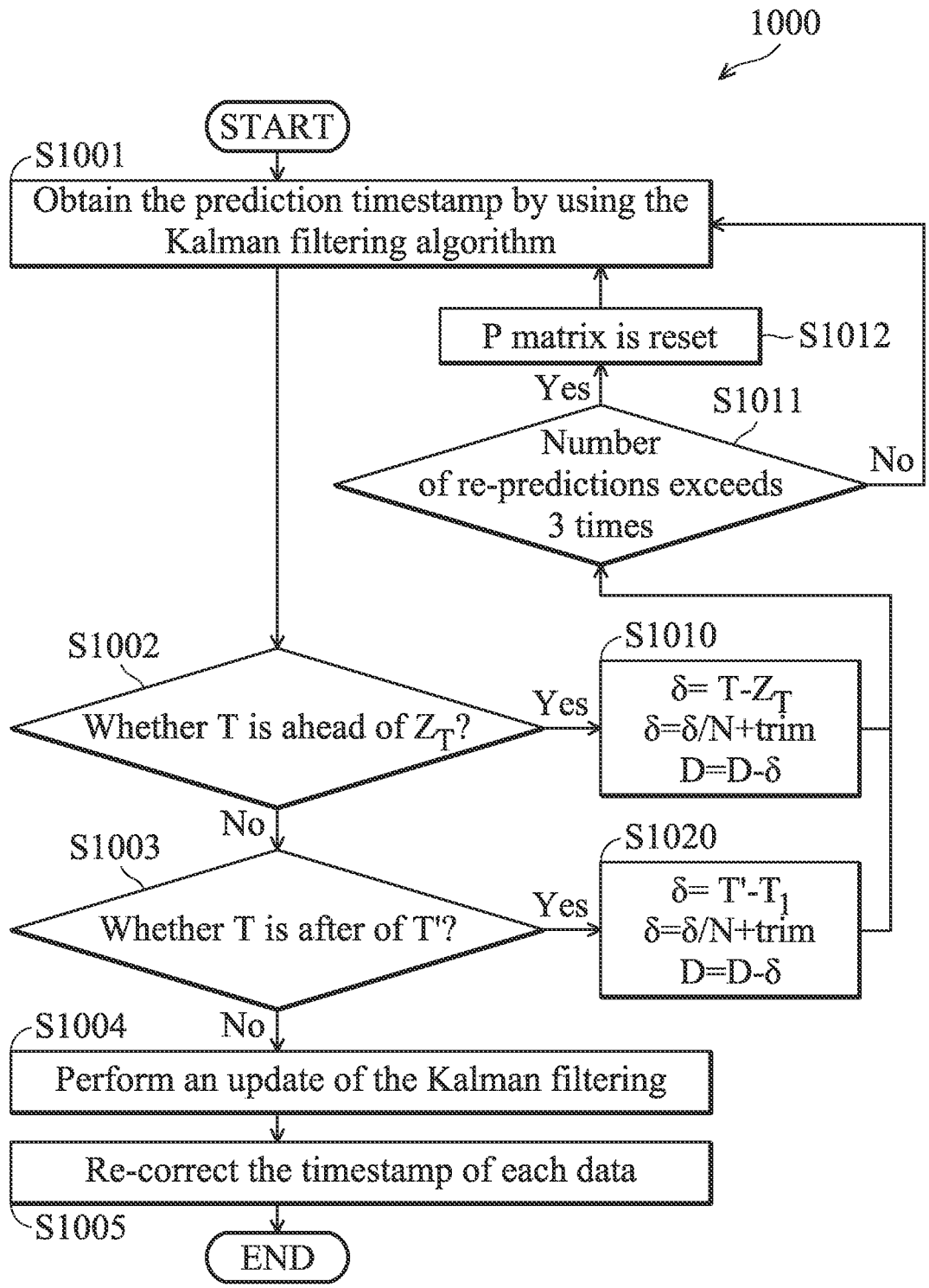
FIG. 10 is a flowchart illustrating a process for updating timestamps according to an exemplary embodiment of the disclosure.

FIG. 10 is a flowchart illustrating a process 1000 for updating timestamps according to an exemplary embodiment of the disclosure. This flowchart is the more detailed description of step S804 in FIG. 8. In FIG. 10, the sensor hub updates timestamps using the filtering algorithm. In this embodiment, taking the Kalman filtering algorithm as an example, the prediction result is iteratively corrected to correct the timestamps.

In step S1001, the sensor hub obtains the prediction timestamp by using the Kalman filtering algorithm. In step S1002, the sensor hub determines whether the prediction timestamp T is ahead of $Z_T$. When the prediction timestamp T is ahead of $Z_T$, the sensor hub calculates the lead amount δ of each timestamp and an adjustment scale trim is added to the lead amount δ, and the Kalman filtering is performed to re-predict the prediction timestamp (as shown in step S1010), wherein δ is an adjustment amount.

In step S1003, the sensor hub determines whether the prediction timestamp T is after T'. When the prediction timestamp T is after T', the sensor hub calculates the lag amount δ of each timestamp and an adjustment scale trim is added to the lag amount δ, and the Kalman filtering is performed to re-predict the prediction timestamp (as shown in step S1020).

In step S1011, when the number of re-predictions exceeds 3 times and there is still a lead or lag problem (it means that the inertia of the parameters in the P matrix is too large, and the lead and lag are large, so that the algorithm cannot be quickly converged), the P matrix is reset (such as step S1012) to make the algorithm quickly converge.

In step S1004, the sensor hub performs an update of the Kalman filtering to update, check the positive definiteness of the P matrix and update T and D.

In step S1005, the sensor hub uses T and D to re-correct the timestamp of each data.

Figure 11:
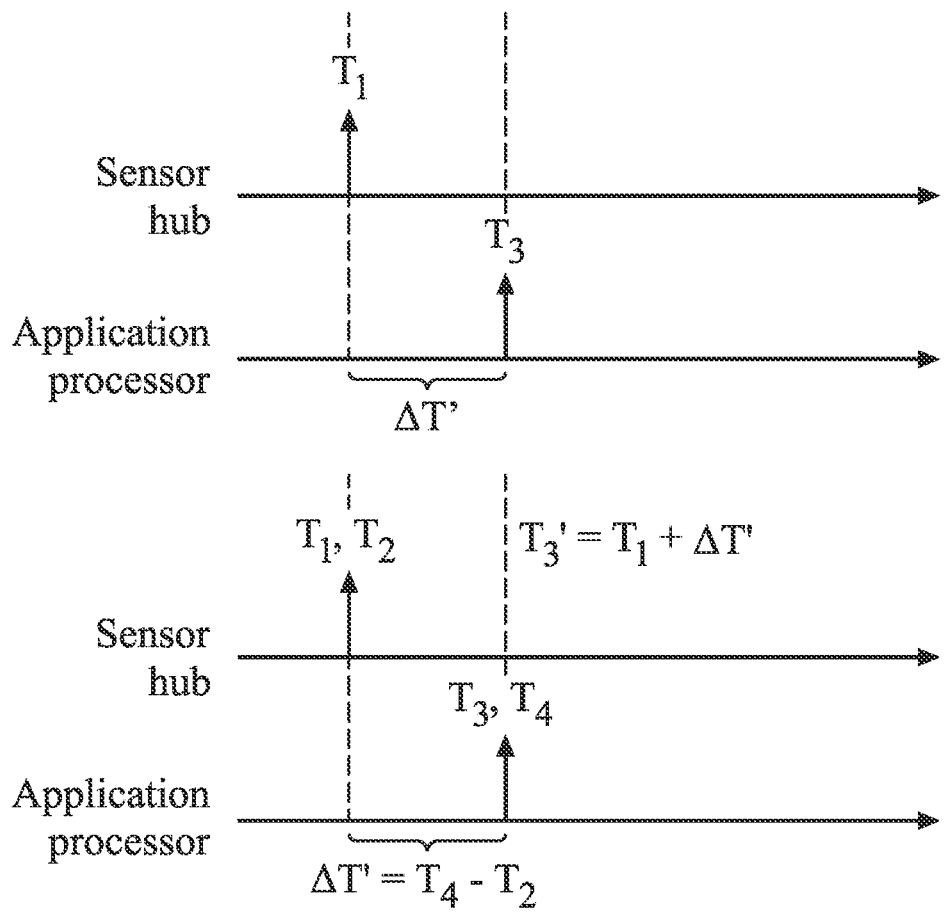
FIG. 11 shows a schematic diagram of synchronization deviation between processors in the prior art.

FIG. 11 shows a schematic diagram of synchronization deviation between processors in the prior art. As shown in FIG. 11, due to the influence of jitter and delay of interrupt transmission and the system response of the application processor, it cannot be guaranteed that $T_1$ and $T_3$ can be obtained at the same real time, so the calculated time offset may be larger than the real deviation by ΔT'.

Figure 12A:
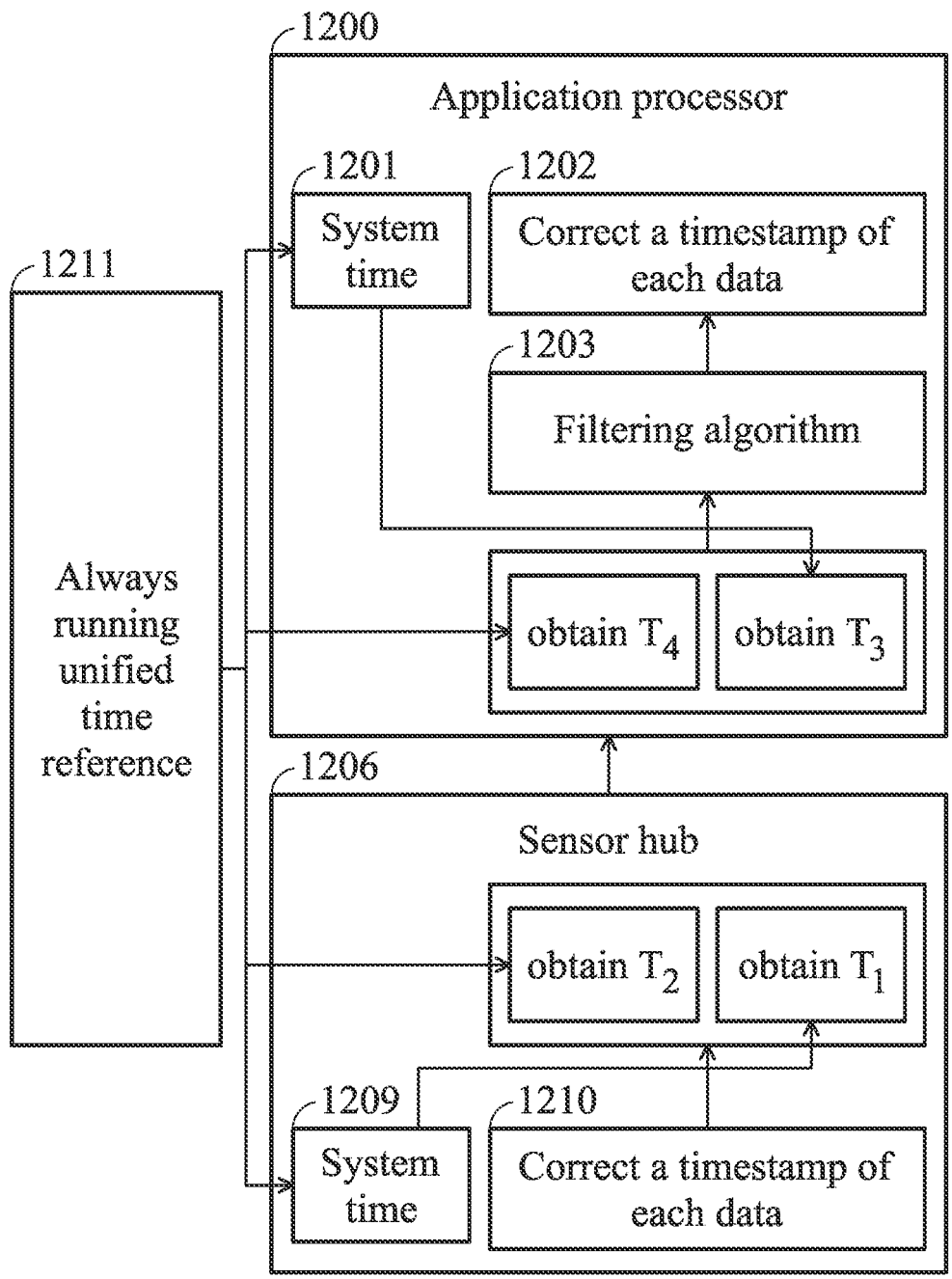
FIG. 12A shows a schematic diagram of a time synchronization method between a sensor hub and an application processor according to an exemplary embodiment of the present disclosure.

FIG. 12A shows a schematic diagram of a time synchronization method between a sensor hub and an application processor according to an exemplary embodiment of the present disclosure. In FIG. 12A, the time synchronization method between the sensor hub and the application processor uses the always-running unified time reference and the de jitter filtering algorithm 1203 to eliminate synchronization transmission deviation and correct timestamps (steps 1202 and 1210). As shown in FIG. 12A, the sensor hub 1206 obtains $T_2$ from the always-running unified time reference 1211 and obtains $T_1$ from the system time 1209. The application processor 1200 obtains $T_4$ from the always-running unified time reference 1211 and obtains $T_3$ from the system time 1201. The system time 1201 and 1209 are both based on the always-running unified time reference 1211.

Figure 12B:
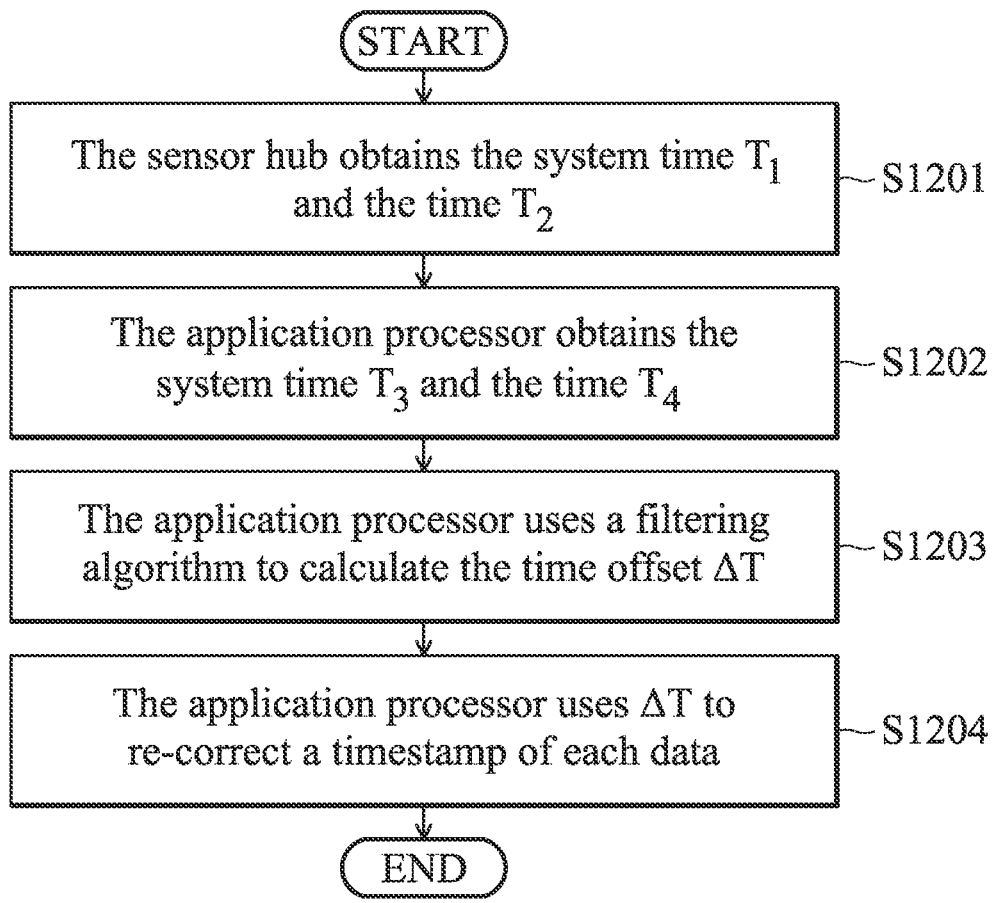
FIG. 12B is a flowchart illustrating a time synchronization method according to an exemplary embodiment of the present invention.

FIG. 12B is a flowchart illustrating a time synchronization method according to an exemplary embodiment of the present invention. The synchronization process between the application processor and the sensor hub is shown in FIG. 12B.

In step S1201, the sensor hub obtains the system time $T_1$ and obtains the time $T_2$ from the always-running unified time reference when the interrupt is terminated. Then, The sensor hub sends the data, $T_1$ and $T_2$ to the application processor through the interrupt signal.

In step S1202, the application processor receives the interrupt signal, obtains the system time $T_3$ through the interrupt handling function and obtains the time $T_4$ from the always-running unified time reference. Then, the application processor calculate $T_3'=T_1+\Delta T'$ (ΔT' is the interrupt time, that is, the time between the system time $T_1$ and the system time $T_3$. Since the application processor is affected by the load, the interrupt may be delayed greatly. The always-running unified time reference used in the disclosure may remove the influence of interrupt transmission, so the application processor may remap $T_1$ to $T_3'$).

In step S1203, the application processor uses a filtering algorithm to calculate the time offset ΔT between the system time of the sensor hub and the system time of the application processor according to $T_3$, $T_3'$. It should be noted that the filtering algorithm may include various algorithms, so the moving window filtering algorithm is taken as an example to demonstrate in the disclosure. When the interval between the current synchronization time and the last synchronization time is too large (that is, the synchronization frequency is too low), the window filter is reset to prevent excessive lag from causing synchronization jitter, and quickly follow the latest ΔT. When the interval between the current synchronization time and the last synchronization time is too small (that is, the synchronization frequency is too high), the synchronization frequency should be suppressed to prevent overfitting. The application processor averages the time difference $(T_3'-T_3)$ stored in the window to obtain ΔT.

In step S1204, the application processor uses ΔT to re-correct a timestamp of each data transmitted from the sensor hub.

Figure 13:
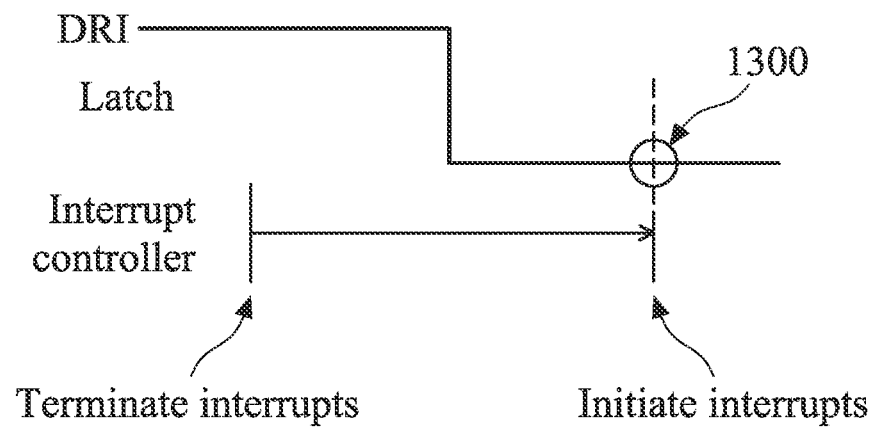
FIG. 13 shows a schematic diagram of a latch being triggered according to another exemplary embodiment of the present disclosure.

In FIG. 12B, an example of a latch being triggered is shown. FIG. 13 shows a schematic diagram of a latch being triggered according to another exemplary embodiment of the present disclosure. In FIG. 13, the latch may determine whether to obtain and store the time from the always-running unified time reference based on the interrupt signal DRI and the signal output from the interrupt controller. When the interrupt controller of the sensor hub terminates the interrupt, the latch does not obtain the interrupt timestamp on the rising (falling) edge of the interrupt signal DRI. When the interrupt controller of the sensor hub initiates the interrupt, the latch is triggered to obtain the interrupt timestamp from always-running unified time reference at time 1300 and store the interrupt timestamp.

Figure 14A:
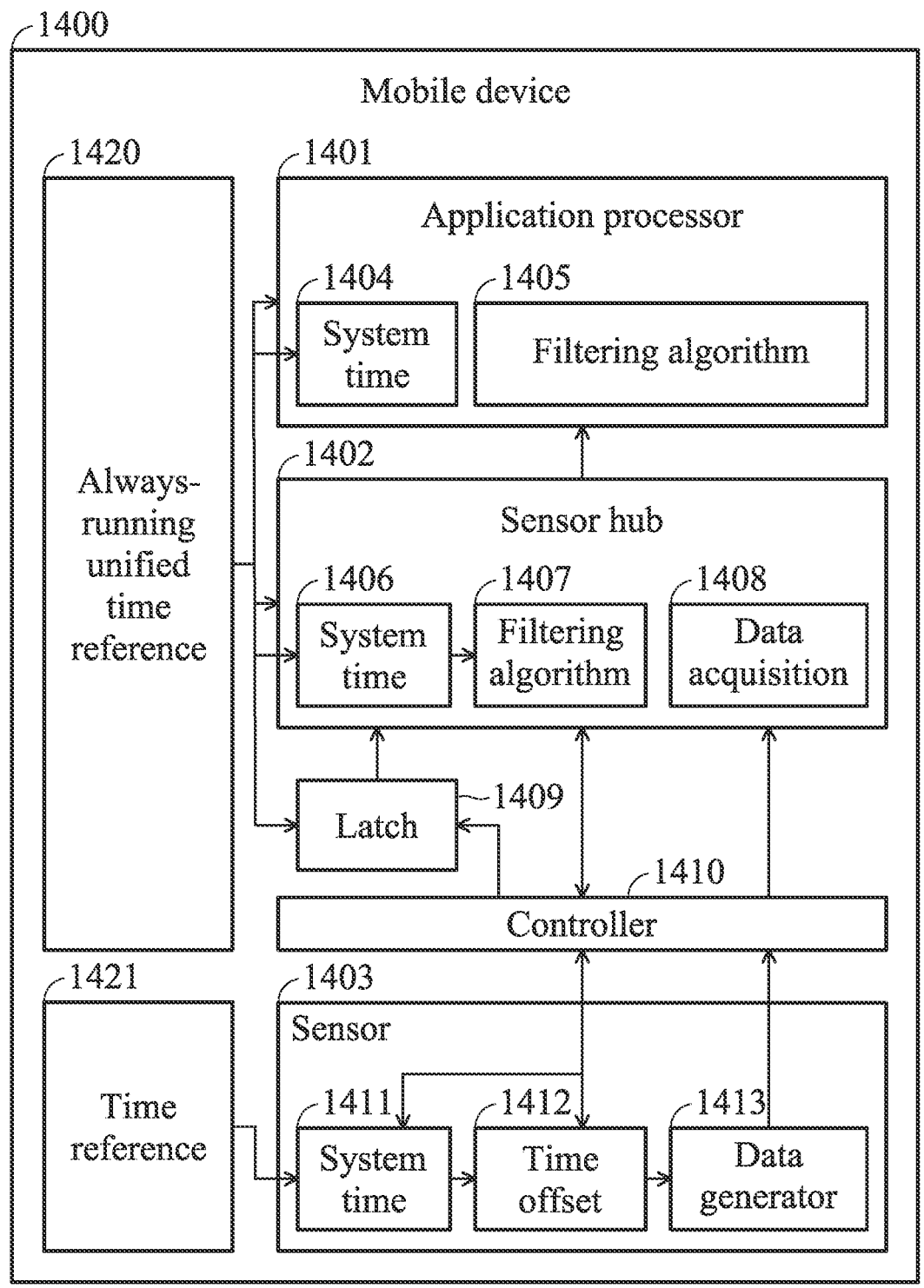
FIG. 14A shows a schematic diagram of a mobile device according to an exemplary embodiment of the present disclosure.

FIG. 14A shows a schematic diagram of a mobile device 1400 according to an exemplary embodiment of the present disclosure. In FIG. 14A, the sensor 1403 is a high-end sensor, which integrates a system time 1411, a time offset 1412 and a data generator 1413, wherein the time reference 1421 provides the time to the system time 1411, and the data generator 1413 generates data with the time based on the system time 1411 and the time offset 1412. The sensor hub 1402 synchronizes the time with the sensor 1403 through the controller 1410 and updates the time offset 1412. The controller 1410 can be an inter-integrated circuit/serial peripheral interface (I2C/SPI) communication interface. The synchronization between the sensor hub 1402 and the sensor 1403 is also affected by the jitter of the communication protocol I2C/SPI controller, the time delay and the response of the sensor hub 1402, resulting in inaccurate deviation between the system time of the sensor 1403 and the system time of the sensor hub 1402 and affecting the timestamp accuracy. Therefore, a latch 1409 is added in the mobile device 1400 to monitor the controller 1410. The time of the latch 1409 is provided by an always-running unified time reference 1420. The latch 1409 can be accessed by the sensor hub 1402 to obtain the time. The system time 1406 of the sensor hub 1402 is provided by the always-running unified time reference 1420. The sensor hub 1402 calculates the time offset according to the system time 1406, the time of the latch 1409 and the system time 1411 by using the filtering algorithm 1407 and writes the time offset into the time offset 1412 through the controller 1410. The data acquisition 1408 of the sensor hub 1402 reads data from the sensor 1403 through the controller 1410.

Figure 14B:
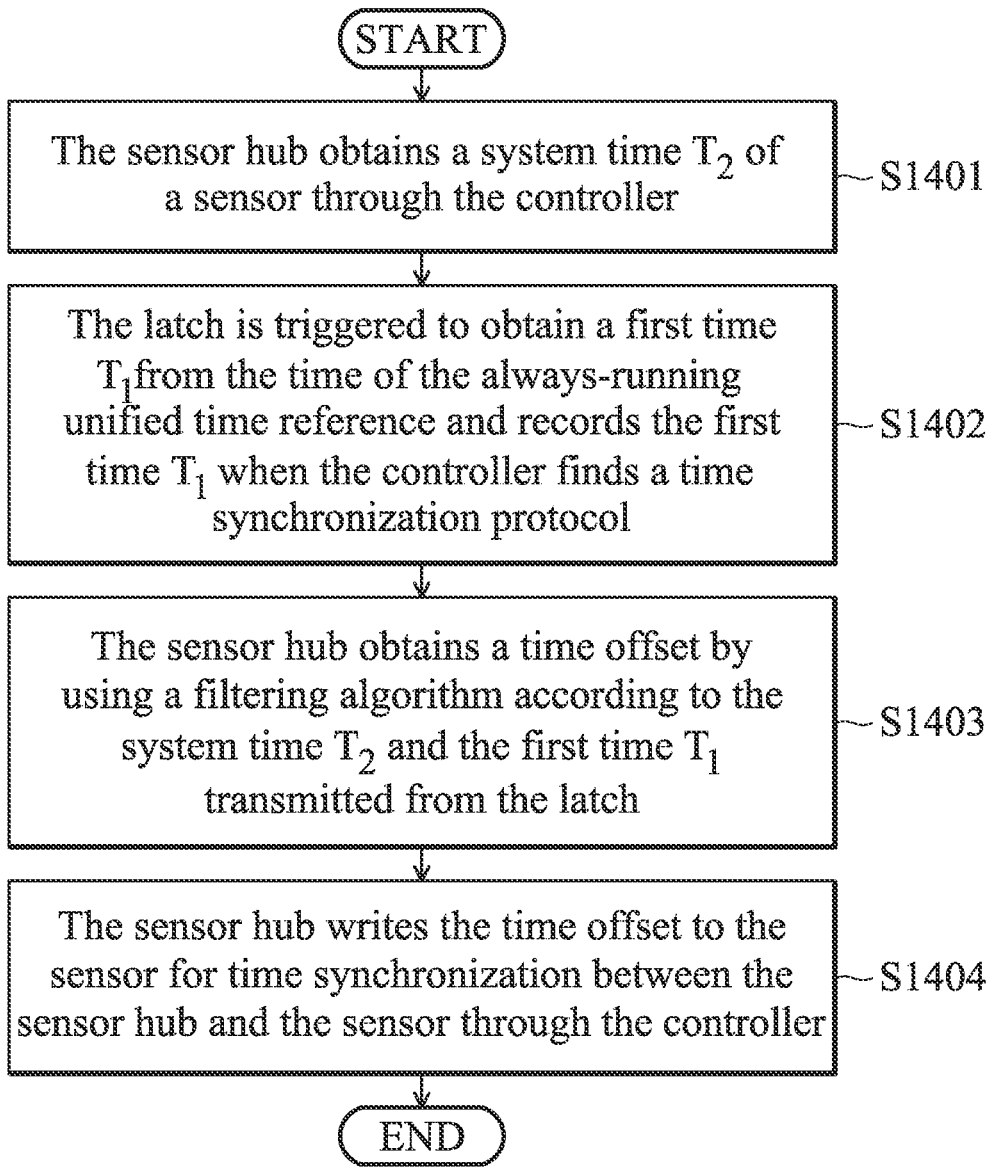
FIG. 14B shows a flowchart of synchronization between the high-end sensor and the sensor hub according to an exemplary embodiment of the present disclosure with reference to FIG. 14A.

FIG. 14B shows a flowchart of synchronization between the high-end sensor and the sensor hub according to an exemplary embodiment of the present disclosure with reference to FIG. 14A.

In step S1401, the sensor hub obtains a system time $T_2$ of a sensor through the controller, wherein the sensor is a high-end sensor and the controller has an I2C/SPI communication interface.

In step S1402, the latch is triggered to obtain a first time $T_1$ from the time of the always-running unified time reference and records the first time $T_1$ when the controller finds a time synchronization protocol, wherein the system time $T_2$ of the sensor is obtained based on a time reference that is different from the always-running unified time reference.

In step S1403, the sensor hub obtains a time offset by using a filtering algorithm according to the system time $T_2$ and the first time $T_1$ transmitted from the latch. Specifically, after the sensor hub obtains the first time $T_1$ and the system time $T_2$, the sensor hub calculates $\Delta T$ ($\Delta T=T_1-T_2$) and performs a filtering algorithm with $\Delta T$ to obtain the time offset.

In step S1404, the sensor hub writes the time offset to the sensor for time synchronization between the sensor hub and the sensor through the controller.

In the example scheme of FIGS. 14A and 14B, a latch is added to monitor the controller. When the controller finds a time synchronization protocol and obtains the system time of the sensor, the controller triggers the latch to immediately obtains the time of the always-running unified time reference and record the time. Then, the controller may notify the sensor hub to perform the filtering algorithm. The operation shown in FIGS. 14A and 14B can effectively eliminate the jitter delay of the controller, the jitter delay of the interrupt sent by the controller to the sensor hub, and the influence of the response sent from the sensor hub, improve the accuracy of time synchronization between the sensor hub and the sensor, and improve the accuracy of the timestamps of data in the sensor.

Figure 15:
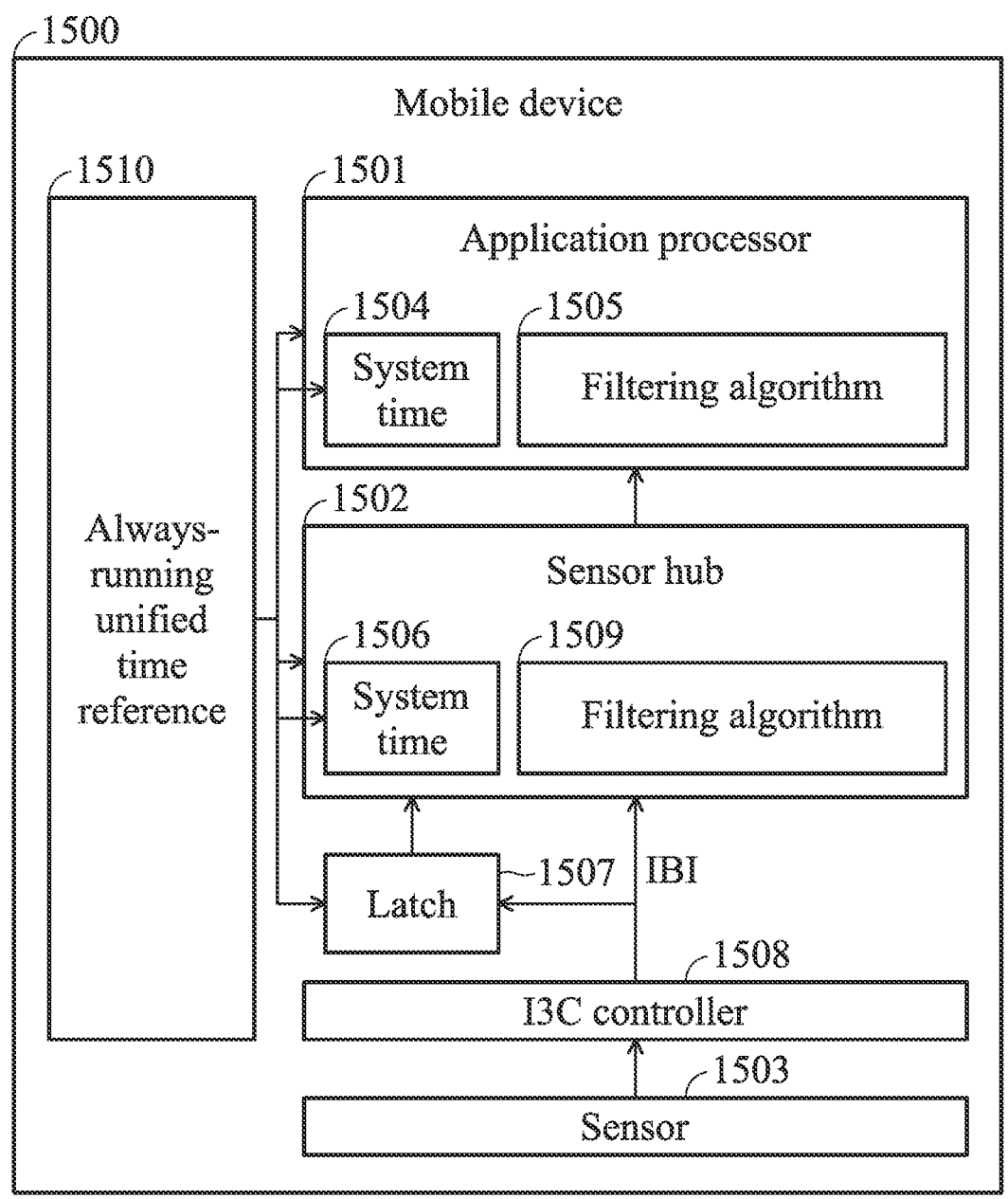
FIG. 15 shows a schematic diagram of a mobile device according to an exemplary embodiment of the present disclosure.

FIG. 15 shows a schematic diagram of a mobile device 1500 according to an exemplary embodiment of the present disclosure. In FIG. 15, an improved inter integrated circuit (I3C) controller 1508 is a controller supporting the I3C protocol. With the rapid development of the I3C protocol, many sensors begin to support the I3C protocol, and the I3C protocol provides an inner band interrupt (IBI) interrupt that can replace the DRI interrupt of the sensor shown in FIG. 2. However, the problem with that is that the latch also needs to be able to monitor the I3C IBI signal. Therefore, in FIG. 15, a latch 1507 is added to monitor the change of the IBI signal from the I3C controller 1508, the time of the latch is provided by the always-running unified time reference 1510 and the latch can be accessed by sensor hub 1502. The latch obtains the timestamp from the always-running unified time reference 1510 and stores the timestamp when the IBI signal conforms to the settings in the I3C protocol. The manner the latch is triggered does not refer to the interrupt state of the interrupt controller (not shown in FIG. 15) of the sensor hub. The latch is triggered to obtain the time from the always-running unified time reference and store the time as long as the signal conforms to the settings in the I3C protocol. Through the above manner, the latch records the time before the IBI is sent to the interrupt controller of the sensor hub, thereby eliminating the deviation $\Delta T$ and greatly improving the accuracy of the timestamp.

Figure 16:
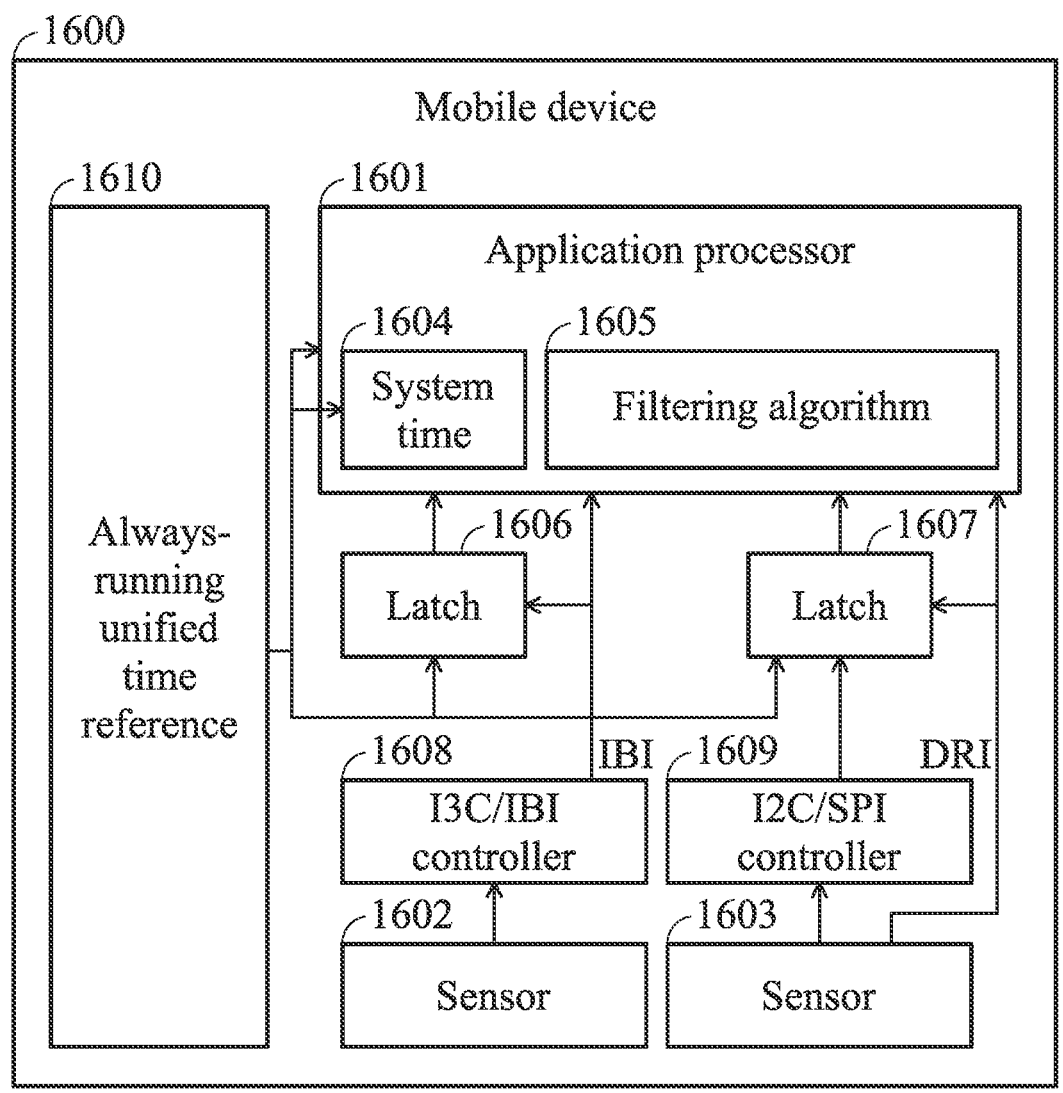
FIG. 16 shows a schematic diagram of a mobile device according to another exemplary embodiment of the present disclosure.

FIG. 16 shows a schematic diagram of a mobile device 1600 according to another exemplary embodiment of the present disclosure. In FIG. 16, the latch 1607 monitors the interrupt signal DRI from the sensor 1603 and monitors the I2C/SPI controller 1609, and the latch 1606 monitors the I3C/IBI controller 1608. Furthermore, the mobile device 1600 in FIG. 16 does not have a sensor hub; instead a processor 1601 of the mobile device 1600 replaces the sensor hub to execute the filtering algorithm. The processor 1601 can be an application processor, and the processor 1601 in FIG. 16 can be adopted to guarantee the timestamp accuracy of some very time-sensitive devices (e.g., a touch screen, an ISP). The processor 1601 may be a flight control device, an AR device, a VR device, a wearable device, an IOT device, etc. The mobile device 1600 ensures the accuracy of the timestamps of a sensor to improve the user experience. The sensor may be shown as a sensor 1602, which communicates with the processor 1601 through I3C controller 1608, or the sensor may be shown as a sensor 1603, which communicates with processor 1601 through the I2C/SPI controller 1609. When there are multiple sensors in the mobile device 1600, the sensors can also be a combination of various forms. The key point is that the system time 1604 of the processor 1601 and the system time of the latch 1606 are based on the same time reference which is the always-running unified time reference 1610, and accurate timestamping is accomplished through an effective filtering algorithm 1605 to improve user experience.

As shown above, the method and device for timestamping and synchronization with high-accuracy timestamps in low-power sensor systems can effectively eliminate the jitter of timestamp caused by the jitter of the interrupt by using the latch, and effectively obtain the time close to the real generation time of sensor data by using the filtering algorithm. Especially in the case where the sensor hub has high load or full load, the device may also ensure the high accuracy of the timestamp and the high match with the real generation time by using the latch and filtering algorithm.

The always-running unified time reference introduced into the present disclosure can ensure that the sensor hub and the application processor are in the same time reference. Since the processing of the hardware time reference by different processors is not consistent, the de-jitter filtering algorithm is used to effectively eliminate the offset between the processors, so as to optimize the user experience.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

What is claimed is:

1. A method for timestamping and synchronization with high-accuracy timestamps in low-power sensor systems, wherein the method is performed by a device and comprises:
    receiving, by a sensor hub of the device, an interrupt signal from a sensor and performing an interrupt service routine (ISR) to obtain an interrupt timestamp from a latch, wherein the interrupt timestamp is obtained from an always-running unified time reference;
    obtaining, by the sensor hub, sensor data from the sensor;
    predicting, by the sensor hub, a prediction timestamp based on an amount of sensor data and the interrupt timestamp by using a filtering algorithm; and
    correcting, by the sensor hub, a timestamp of each sensor data based on the prediction timestamp.

2. The method for timestamping and synchronization with high-accuracy timestamps in low-power sensor systems as claimed in claim 1, wherein the interrupt timestamp is obtained from the always-running unified time reference when a level of a signal output from a sensor interrupt pin between the sensor and the sensor hub has changed.

3. The method for timestamping and synchronization with high-accuracy timestamps in low-power sensor systems as claimed in claim 1, wherein the interrupt timestamp is obtained from the always-running unified time reference when an interrupt controller in the sensor hub initiates an interrupt.

4. The method for timestamping and synchronization with high-accuracy timestamps in low-power sensor systems as claimed in claim 1, wherein the filtering algorithm is a Kalman filtering algorithm.

5. The method for timestamping and synchronization with high-accuracy timestamps in low-power sensor systems as claimed in claim 4, wherein predicting the prediction timestamp based on the amount of sensor data and the interrupt timestamp by using the filtering algorithm further comprises:
    selecting filter parameters according to the amount of sensor data and the interrupt timestamp;
    calculating a trust interval based on the filtering parameters;
    obtaining Kalman filter matrices according to the trust interval, the interrupt timestamp and an event trigger type; and
    predicting the prediction timestamp according to the Kalman filter matrices.

6. The method for timestamping and synchronization with high-accuracy timestamps in low-power sensor systems as claimed in claim 4, wherein correcting the timestamp of each sensor data based on the prediction timestamp further comprises:
    determining whether the prediction timestamp is before the interrupt timestamp and whether a first prediction timestamp lags behind the timestamp;
    performing a Kalman filter update to update the prediction timestamp and an average interval between the sensor data; and
    correcting the timestamp of each sensor data based on the prediction timestamp and the average interval.

7. The method for timestamping and synchronization with high-accuracy timestamps in low-power sensor systems as claimed in claim 1, wherein the interrupt timestamp is obtained from the always-running unified time reference when an inner band interrupt (IBI) signal output from an improved inter integrated circuit (I3C) controller conforms to settings in an I3C protocol.

8. The method for timestamping and synchronization with high-accuracy timestamps in low-power sensor systems as claimed in claim 1, wherein a system time of an application processor, a system time of the sensor hub, and a system time of the latch are derived from the time of the always-running unified time reference.

9. The method for timestamping and synchronization with high-accuracy timestamps in low-power sensor systems as claimed in claim 1, wherein an application processor performs steps performed by the sensor hub when the device does not have the sensor hub.

10. The method for timestamping and synchronization with high-accuracy timestamps in low-power sensor systems as claimed in claim 1, wherein the method further comprises:
obtaining, by the sensor hub, a system time of the sensor hub and a first time from the always-running unified time reference;
obtaining, by an application processor of the device, a system time of the application processor according to the interrupt signal and a second time from the always-running unified time reference;
calculating, by the application processor, a time offset between the system time of the sensor hub and the system time of the application processor according to the system time of the application processor and the system time of the sensor hub by using a filtering algorithm; and
using, by the application processor, the time offset to re-correct the timestamp of each data transmitted from the sensor hub.

11. The method for timestamping and synchronization with high-accuracy timestamps in low-power sensor systems as claimed in claim 1, wherein the method further comprises:
obtaining, by the sensor hub, a system time from the sensor through a controller;
obtaining, by the latch, a first time from the time of the always-running unified time reference when the controller finds a time synchronization protocol;
obtaining, by the sensor hub, a time offset by using a filtering algorithm according to the system time and the first time transmitted from the latch; and
writing, by the sensor hub, the time offset to the sensor for time synchronization between the sensor hub and the sensor through the controller;
wherein the system time is based on a time reference that is different from the always-running unified time reference.

12. The method for timestamping and synchronization with high-accuracy timestamps in low-power sensor systems as claimed in claim 11, wherein the sensor is a high-end sensor and the controller is an inter-integrated circuit/serial peripheral interface (I2C/SPI) communication interface.

13. A device for timestamping and synchronization with high-accuracy timestamps in low-power sensor systems, comprising:
a sensor hub, coupled to a latch and a sensor, and the sensor hub executes:
receiving an interrupt signal from the sensor and performing an interrupt service routine (ISR) to obtain an interrupt timestamp from the latch, wherein the interrupt timestamp is obtained from an always-running unified time reference;
obtaining sensor data from the sensor;
predicting a prediction timestamp based on an amount of sensor data and the interrupt timestamp by using a filtering algorithm; and
correcting a timestamp of each sensor data based on the prediction timestamp.

14. The device for timestamping and synchronization with high-accuracy timestamps in low-power sensor systems as claimed in claim 13, wherein the interrupt timestamp is obtained from the always-running unified time reference when a level of a signal output from a sensor interrupt pin between the sensor and the sensor hub has changed.

15. The device for timestamping and synchronization with high-accuracy timestamps in low-power sensor systems as claimed in claim 13, wherein the device further comprises:
an interrupt controller of the sensor hub;
wherein the interrupt timestamp is obtained from the always-running unified time reference when the interrupt controller in the sensor hub initiates an interrupt.

16. The device for timestamping and synchronization with high-accuracy timestamps in low-power sensor systems as claimed in claim 13, wherein the filtering algorithm is a Kalman filtering algorithm.

17. The device for timestamping and synchronization with high-accuracy timestamps in low-power sensor systems as claimed in claim 16, wherein the step of predicting the prediction timestamp based on the amount of sensor data and the interrupt timestamp by using the filtering algorithm further comprises:
selecting filter parameters according to the amount of sensor data and the interrupt timestamp;
calculating a trust interval based on the filtering parameters;
obtaining Kalman filter matrices according to the trust interval, the interrupt timestamp and an event trigger type; and
predicting the prediction timestamp according to the Kalman filter matrices.

18. The device for timestamping and synchronization with high-accuracy timestamps in low-power sensor systems as claimed in claim 16, wherein the step of correcting the timestamp of each sensor data based on the prediction timestamp further comprises:
determining whether the prediction timestamp is before the interrupt timestamp and whether a first prediction timestamp lags behind the timestamp;
performing a Kalman filter update to update the prediction timestamp and an average interval between the sensor data; and
correcting the timestamp of each sensor data based on the prediction timestamp and the average interval.

19. The device for timestamping and synchronization with high-accuracy timestamps in low-power sensor systems as claimed in claim 13, wherein the device further comprises:
an improved inter integrated circuit (I3C) controller, coupled to the latch and the sensor;
wherein the interrupt timestamp is obtained from the always-running unified time reference when an inner band interrupt (IBI) signal output from the I3C controller conforms to settings in an I3C protocol.

20. The device for timestamping and synchronization with high-accuracy timestamps in low-power sensor systems as claimed in claim 13, wherein a system time of an application processor, a system time of the sensor hub, and a system time of the latch are derived from the time of the always-running unified time reference.

21. The device for timestamping and synchronization with high-accuracy timestamps in low-power sensor systems as claimed in claim 13, wherein the device further comprises an application processor, and the application processor performs steps performed by the sensor hub when the device does not have the sensor hub.

22. The device for timestamping and synchronization with high-accuracy timestamps in low-power sensor systems as claimed in claim 13, wherein the device further comprises:
- an application processor, coupled to the sensor hub;
- wherein the sensor hub obtains a system time of the sensor hub and a first time from the always-running unified time reference, and the application processor further executes:
- obtaining a system time of the application processor according to the interrupt signal and a second time from the always-running unified time reference;
- calculating a time offset between the system time of the sensor hub and the system time of the application processor according to the system time of the application processor and the system time of the sensor hub by using a filtering algorithm; and
- using the time offset to re-correct the timestamp of each data transmitted from the sensor hub.

23. The device for timestamping and synchronization with high-accuracy timestamps in low-power sensor systems as claimed in claim 13, wherein the sensor hub and the latch further executes:
- obtaining, by the sensor hub, a system time from the sensor through a controller;
- obtaining, by the latch, a first time from the time of the always-running unified time reference when the controller finds a time synchronization protocol;
- obtaining, by the sensor hub, a time offset by using a filtering algorithm according to the system time and the first time transmitted from the latch; and
- writing, by the sensor hub, the time offset to the sensor for time synchronization between the sensor hub and the sensor through the controller;
- wherein the system time is based on a time reference that is different from the always-running unified time reference.

24. The device for timestamping and synchronization with high-accuracy timestamps in low-power sensor systems as claimed in claim 23, wherein the sensor is a high-end sensor and the controller is an inter-integrated circuit/serial peripheral interface (I2C/SPI) communication interface.

* * * * *